United States Patent
Liu et al.

(10) Patent No.: US 11,028,286 B2
(45) Date of Patent: Jun. 8, 2021

(54) DUAL CURABLE SILICONE COMPOSITIONS

(71) Applicant: Dow Silicones Corporation, Midland, MI (US)

(72) Inventors: Junying Liu, Midland, MI (US); Nanguo Liu, Midland, MI (US); Joel McDonald, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/620,919

(22) PCT Filed: Jul. 24, 2018

(86) PCT No.: PCT/US2018/043361
§ 371 (c)(1),
(2) Date: Dec. 10, 2019

(87) PCT Pub. No.: WO2019/027717
PCT Pub. Date: Feb. 7, 2019

(65) Prior Publication Data
US 2020/0199403 A1  Jun. 25, 2020

Related U.S. Application Data

(60) Provisional application No. 62/539,125, filed on Jul. 31, 2017.

(51) Int. Cl.
| | |
|---|---|
| *C08F 2/46* | (2006.01) |
| *C08F 2/50* | (2006.01) |
| *C08G 61/04* | (2006.01) |
| *C09D 183/06* | (2006.01) |
| *C08L 83/06* | (2006.01) |

(52) U.S. Cl.
CPC .......... *C09D 183/06* (2013.01); *C08L 83/06* (2013.01); *C08L 2205/025* (2013.01)

(58) Field of Classification Search
CPC .... C08L 83/06; C08L 83/00; C08L 2205/025; C09D 183/06; C08G 77/14; C08K 5/0091; C08K 5/59
USPC ............. 522/25, 7, 6, 189, 184, 71, 1; 520/1
See application file for complete search history.

(56) References Cited

U.S. PATENT DOCUMENTS

| | | |
|---|---|---|
| 3,334,067 A | 8/1967 | Weyenberg |
| 3,981,897 A | 9/1976 | Crivello |
| 4,026,705 A | 5/1977 | Crivello et al. |
| 4,069,055 A | 1/1978 | Crivello |
| 4,161,478 A | 7/1979 | Crivello |
| 4,966,922 A * | 10/1990 | Gross ................... C08K 5/0025 522/170 |
| 2010/0069523 A1* | 3/2010 | Alvarez ................. C08G 77/50 522/148 |

FOREIGN PATENT DOCUMENTS

| | | |
|---|---|---|
| WO | 9735924 | 10/1997 |
| WO | 1997035924 | * 10/1997 |

OTHER PUBLICATIONS

Frances et al, WO 1997035924 Machine Translation, Oct. 2, 1997 (Year: 1997).*

* cited by examiner

*Primary Examiner* — Jessica Whiteley

(57) ABSTRACT

A dual curable silicone composition, comprising: (a) a silicone resin comprising at least one epoxy group, (b) a silicone polymer comprising at least one epoxy group and at least one hydrolyzable group, (c) a catalytic amount of onium salt photo catalyst, (d) a catalytic amount of condensation catalyst, wherein the composition is curable when exposed to UV radiation, $H_2O$, or UV radiation and $H_2O$.

10 Claims, No Drawings

DUAL CURABLE SILICONE COMPOSITIONS

CROSS-REFERENCE TO RELATED APPLICATIONS

None

FIELD OF THE INVENTION

The present invention relates, generally, to dual curable silicone composition comprising a silicone resin comprising at least one epoxy group, a silicone polymer comprising at least one epoxy group and at least one hydrolyzable group, a catalytic amount of onium salt photo catalyst, a condensation catalyst, wherein the composition is curable when exposed to UV radiation, H$_2$O, or UV radiation and H$_2$O.

BACKGROUND OF THE INVENTION

Curable silicones have been used as protective coatings and encapsulants to provide moisture resistance and thermal stability, among other properties. These silicones can cure by different mechanisms. For example, ultraviolet light (UV) cure and moisture cure have been taught. UV curable silicones include, for example, radical cure, such as acrylate cure, thiol-ene cure, and cationic cure. UV cure systems generally provide high cure speed and, therefore, high throughput and can be made without including solvent in the system. Moisture cure compositions cure through hydrolysis and condensation of hydrolytic groups.

Dual cure systems have also been developed where the composition cures by both a moisture cure mechanism and a UV cure mechanism. These dual cure systems are suited to applications with shadow areas, where the UV curable systems do not adequately cure. In the dual cure systems, the moisture cure components cure in the shadow area and the UV cure components cure in the areas with adequate UV exposure. For example, dual cure silicone compositions have been developed where the silicone polymer has both epoxy and hydrolyzable groups so the composition will cure by exposure to both UV light and moisture.

Known single cure and dual cure compositions have drawbacks. These compositions can have unpleasant odors, be costly to produce or use, be inhibited by oxygen resulting in poor cure except under inert conditions, or may not provide adequate hardness and flexibility to the resulting coating.

BRIEF SUMMARY OF THE INVENTION

The present invention is directed to a dual curable silicone composition, comprising: (a) a silicone resin comprising at least one epoxy group, (b) a silicone polymer comprising at least one epoxy group and at least one hydrolyzable group, (c) a catalytic amount of an onium salt photo catalyst, (d) a catalytic amount of condensation catalyst, wherein the composition is curable when exposed to UV radiation, H$_2$O, or UV radiation and H$_2$O.

The present invention provides compositions that produce films of high hardness with good flexibility, are economical to produce, and that are not inhibited by exposure to oxygen.

DETAILED DESCRIPTION OF THE INVENTION

A dual curable silicone composition, comprising:
(a) a silicone resin comprising at least one epoxy group,
(b) a silicone polymer comprising at least one epoxy group and at least one hydrolyzable group,
(c) a catalytic amount of an onium salt photo catalyst,
(d) a catalytic amount of condensation catalyst,
wherein the composition is curable when exposed to UV radiation, H$_2$O, or UV radiation and H$_2$O.

The silicone resin comprises at least one epoxy group, alternatively the silicon resin is according formula (I)

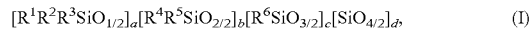

$$[R^1R^2R^3SiO_{1/2}]_a[R^4R^5SiO_{2/2}]_b[R^6SiO_{3/2}]_c[SiO_{4/2}]_d, \quad (I)$$

where each $R^{1-6}$ is independently hydrocarbyl, H, hydroxyl, alkoxy, or an epoxy-containing group and at least one of $R^{1-6}$ is an epoxy-containing group, and where a+b+c+d=1 and c+d>0.

Hydrocarbyl groups represented by $R^{1-6}$ typically have from 1 to 18, alternatively from 1 to 10 carbon atoms, alternatively from 1 to 6 carbon atoms, alternatively from 1 to 4 carbon atoms. Acyclic hydrocarbyl groups containing at least 3 carbon atoms can have a branched or unbranched structure. Examples of hydrocarbyl groups represented by $R^{1-3}$ include, but are not limited to, alkyl, such as methyl ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, propenyl, butenyl, hexenyl, and octenyl; arylalkenyl, such as styryl and cinnamyl; and alkynyl, such as ethynyl and propynyl. In one embodiment, $R^4$ is methyl, $R^5$ is phenyl, 45-55 mole %, alternatively about 50 mole %, of the $R^6$ groups are epoxy groups and 45-55 mole %, alternatively about 50 mole %, of $R^6$ groups are isobutyl groups.

Alkoxy groups represented by $R^{1-6}$ have the formula —Oalk where O is oxygen and alk is alkyl having from 1 to 10 carbon atoms, alternatively from 1 to 6 carbon atoms, alternatively from 1 to 4 carbon atoms. Examples of alkyl groups represented by alk include, but are not limited to, those exemplified for $R^{1-6}$.

The epoxy-containing groups represented by $R^{1-6}$ are each independently substituted hydrocarbyl having from 2 to 18, alternatively 2 to 12, alternatively 3 to 10, carbon atoms. The substitute group of the substituted hydrocarbyl is epoxide or epoxyether, alternatively epoxide, alternatively epoxyether. When the substitute group is epoxide, the epoxide if formed between two adjacent carbon atoms of the hydrocarbyl. When the substitute group is an epoxyether, the substituted hydrocarbyl typically is according to the fomula -L-O-Ep, where L is hydrocarbylene having from 1 to 8, alternatively 1 to 4, alternatively 1 to 3, carbon atoms, O is oxygen atom, and Ep is epoxyhydrocarbyl having from 1 to 10, alternatively 1 to 7, alternatively 3 to 6, carbon atoms, where an epoxide is formed between two adjacent carbon atoms of the hydrocarbyl of the EP.

The epoxy group may be formed in the silicone resin through hydrosilation reaction, condensation reaction, Grignard reaction, alternatively the epoxy group may be incorporated into the polymer or resin by reaction with a silane monomer comprising the epoxy group already, for example a glycidoxypropyltrimethoxysilane or cyclohexeneoxidetrimethoxysilane may be reacted with other silane monomers or siloxane polymers or resins. The epoxy group is capable of reaction with other epoxy functional groups with exposure to UV light in the presence of onium salt photocatalysts and is stable under hydrolytic conditions.

Examples of the epoxy groups of the silicone resin include, but are not limited to, glycidyl, glycidoxypropyl, epoxypentyl, glycidoxybutyl, glycidoxyhexyl, glycidoxyoctyl, epoxycyclohexane (cyclohexene oxide) bonded to silicon through the 3, 4, 5, or 6 positions of the ring by removing one of the hydrogen atoms of the cyclohexane ring or through an alkylene linking group having 1 to 6 carbon atoms and linking between the hexane ring and the silicon atom such as [2-(3,4-epoxycyclohexyl)ethyl] group, cyclohexeneoxyalkyl oxide linking to the silicon atom though an oxyalkyl linking group having from 1 to 6 carbon atoms and linking to the 3, 4, 5, or 6 position of the carbon ring. As used herein, glycidyl is intended to mean —$CH_2CHOCH_2$, and glycidoxy is intended to mean —$OCH_2CHOCH_2$, where $CHOCH_2$ is the epoxy group, and cyclohexeneoxyalkyl oxide is intended to mean -Alk-O—$C_6H_9O$, where Alk is a hydrocarbylene linking group having from 1 to 6 carbon atoms and where $C_6H_9O$ is cyclohexenyl oxide. One skilled in the art would know how to form the silicon-expoxy functionality.

In formula (I) of the silicone resin, the subscripts a, b, c, and d represent average numbers of each unit in the resin. The subscript a has a value of from 0 to 0.9, alternatively 0 to 0.5, alternatively 0. The subscript b has a value of from 0 to 0.9, alternatively 0.1 to 0.50, alternatively 0.28 to 0.37. The subscript c has a value of from 0 to 0.9, alternatively 0.2 to 0.85, alternatively 0.5 to 0.75. The subscript d has a value of from 0 to 0.9, alternatively 0 to 0.15, alternatively 0. The subscript c+d>0, and a+c+b+d=1 In one embodiment, in formula (I) subscripts a=d=0, subscript b=0.28 to 0.37, alternatively 0.33 to 0.35, and subscript c=0.65 to 0.80, alternatively 0.72 to 0.77, $R^4$ is methyl, $R^5$ is phenyl, 50 mole % of the $R^6$ groups are epoxy groups and 45-50 mole % of $R^6$ groups are isobutyl groups.

One skilled in the art would know how to make the silicone resin. For example, alkylalkoxysilanes, such as methyltrimethoxysilane, dimethyldimethoxysilane, and trimethyltrimethoxysilane, may be combined and reacted with a metal hydroxide, such as NaOH, KOH, or CsOH, water and an epoxy-functional silane such as glycidyltrimethoxysilane, followed by separation and neutralization. One skilled in the art would know conditions and reactors to use in making the silicone resin.

The silicone polymer comprises at least one epoxy group and at least one hydrolyzable group, alternatively the silicone polymer is according to formula (II)

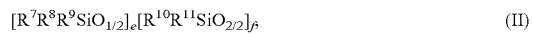

$$[R^7R^8R^9SiO_{1/2}]_e[R^{10}R^{11}SiO_{2/2}]_f \quad (II)$$

where each $R^{7-11}$ is independently hydrocarbyl, H, hydroxyl, a hydrolyzable group, or epoxy-containing group and at least one of $R^{7-11}$ group is hydrolyzable group and at least one, alternatively at least 2, of $R^{7-11}$ groups is an epoxy-containing group, subscript e>0, and subscript f>0.

Hydrocarbyl, alkoxy, and epoxy groups represented by $R^{7-11}$ are as described above for the $R^{1-6}$. The hydrolyzable group represented by $R^{7-11}$ include any group which will hydrolyze in the presence of water to leave hydroxyl functionality. Preferred hydrolyzable leaving groups are those most commonly employed which are alkoxy, such as methoxy, propoxy, octyloxy, etc., and acyloxy such as acetoxy, etc. However, other known hydrolyzable leaving groups are also known. These groups include amido, amino, carbamato, enoxy, imidato, isocyanato, oximato, thioisocyanato, and ureido. These hydrolyzable groups are well known. Where more than one hydrolyzable group is present, the hydrolyzable group may be a mixture of the above groups. In one embodiment, the hydrolysable group is methoxy, ethoxy, propoxy, or butoxy, alternatively methoxy.

The hydrolyzable group may be bound to a silicon atom directly leaving a silanol group when hydrolyzed, alternatively the hydrolyzable group is bonded to the silicon atom through another linking group such as an alkylene which leaves a hydroxyl group on the linking group when hydrolyzed, alternatively the hydrolyzable group is a $C_{1-12}$ hydrocarbyl group substituted with a hydrolyzable group, alternatively substituted with tri($C_{1-8}$ alkoxy)silane. Examples of hydrolyzable groups bonded to the silicon atom through an alkylene linking group include, but are not limited to, trimethoxysilyl, triacetoxysilyl and trisketoximosilyl, where the linking group may be ethylene, propylene, or butylene.

The groups $R^{7-11}$ may be a mixture of groups, alternatively $R^{7-9}$ are a mixture of alkoxy having from 1 to 6 carbon atoms and epoxy-containing groups, and $R^{10-11}$ are a mixture of alkyl having from 1 to 6 carbon atoms, epoxy-containing groups and alkoxy groups having from 1 to 10, alternatively 1 to 6, carbon atoms, alternatively $R^{7-8}$ are both methoxy, $R^9$ is glycidyl, glycidoxypropyl, cyclohexenoxypropyl oxide, [2-(3,4-epoxycyclohexyl)ethyl] group, or cyclohexenyl oxide, and $R^{10-11}$ are a mixture of 95-99 mole %, alternatively 97-99 mole %, of methyl groups, 0.25 to 2.5 mole %, alternatively 0.8 to 1.2 mole %, methoxy groups, and 0.25 to 2.5 mole %, alternatively 0.8 to 1.2 mole %, of glycidyl, glycidoxypropyl, cyclohexenoxypropyl oxide, [2-(3,4-epoxycyclohexyl)ethyl] group, or epoxycyclohexenyl groups, alternatively the $R^{10}R^{11}SiO_{2/2}$ unit represents two monomers, where one monomer has $R^{10}=R^1$=methyl and one monomer where $R^{10}$ is methoxy and R-11 is an epoxy-containing group, alternatively glycidyl, alternatively epoxyhexyl or epoxycyclohexyl, alternatively glycidoxypropyl, alternatively epoxyhexanealkyl oxide, alternatively [2-(3,4-epoxycyclohexyl)ethyl].

In formula (II) for the silicone polymer, the subscripts e and f represent the average repeating units for the silicone polymer. The subscript e has a value of about 2, alternatively 2. The subscript f has a value from 10 to 3000, alternatively from 10 to 200.

One skilled in the art would know how to make the silicone polymer. For example, silanol fluid and 3-glycidoxypropyltrimethoxysilane may be reacted with acetic acid at elevated temperature and the product recovered. One skilled in the art would know the conditions and reactors to use in the production of the silicone polymer.

The silicone resin and the silicone polymer are both characterized by (gas phase chromatography (GPC) and silicon nuclear magnetic resonance (Si NMR). One skilled in the art would know how to characterize the silicone resin and silicone polymer using GPC and Si NMR.

The onium salt photocatalysts are well known, particularly for use with epoxy functional materials. Generally the onium salt photocatalysts may be divided into three classes, namely the halonium photocatalysts, the sulfonium photocatalysts, and the phosphonium photocatalysts.

The halonium salts are represented by the general formula:

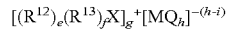

$$[(R^{12})_e(R^{13})_fX]_g^+[MQ_h]^{-(h-i)}$$

where $R^{12}$ is a monovalent aromatic organic radical; $R^{13}$ is a divalent aromatic organic radical; X is a halogen, such as I, Br, Cl, etc.; M is a metal or a metalloid; Q is a halogen radical, such as Cl, F, Br, I, etc.; e is a whole number equal to 0 or 2; f is a whole number equal to 0 or 1; e+f=2 or the valence of X; g=h−i; i is the valence of M and is an integer from 2 to 7 inclusive; and h is greater than i and has a value up to and including 8. Preferred halonium salts are iodonium salts and are exemplified by 3-methoxyphenyl-phenyl-phenyl-I$^+$BF$_4^-$, 2-nitrophenyl-phenyl-I$^+$BF$_4^-$, (C$_{12}$H$_{25}$-phenyl)$_2$I$^+$SbF$_6^-$, etc. The halonium salts are well known and are discussed further in U.S. Pat. Nos. 4,026,705 and 3,981,897, hereby incorporated by reference.

Sulfonium salts may be represented by the general formula:

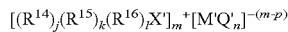

where $R^{14}$ is a monovalent aromatic organic radical; $R^{15}$ is a monovalent organic aliphatic radical selected from alkyl, cycloalkyl, and substituted alkyl; $R^{16}$ is a polyvalent organic radical forming a heterocyclic or fused ring structure selected from aliphatic radicals and aromatic radicals; X' is a group VIa element selected from sulfur, selenium and tellurium; M' is a metal or metalloid; Q' is a halogen radical, j is a whole number of 0, 1, 2 or 3; k is a whole number of 0, 1 or 2; I is a whole number of 0 or 1; j+k+1=3 or the valence of X; m=n-p; p is the valence of M' and is an integer of from 2 to 7 inclusive; and n is greater than p and is an integer having a value up to 8. Consistent with the name given herein, it is preferred that X' be sulfur. Suitable sulfonium salts include triphenyl$^-$S$^+$SbF$_6^-$; 4-thiophenoxyphenyl-diphenyl-S$^+$SbF$_6^-$, tricyclodiphenylenephenyl-S$^+$BF$_4^-$, benzoylmethyl-cyclo-butylene S$^+$PF$_6^-$. Further sulfonium salts are disclosed in U.S. Pat. No. 4,161,478, hereby incorporated by reference.

The phosphonium salts may be represented by the formula:

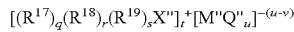

where $R^{17}$ is a monovalent aromatic organic radical selected from carbocyclic radicals and heterocyclic radicals; $R^{18}$ is a monovalent organic aliphatic radical selected from alkyl, alkoxy, cycloalkyl and substituted derivatives thereof; $R^{19}$ is a polyvalent organic radical forming an aromatic heterocyclic or fused ring structure with X"; X" is a group V element selected from N, P, As, Sb, and Bi; M" is a metal or metalloid; Q" is a halogen radical; q is a whole number equal to 0 to 4 inclusive; r is a whole number equal to 0 to 2 inclusive; s is a whole number equal to 0 to 2 inclusive; q+r+s is a value equal to 4 or the valence of X"; t=u-v; v is the valence of M" and is an integer of from 2 to 7 inclusive; and u is greater than v and is an integer having a value up to 8. X" is preferably phosphorus as understood from the term phosphonium salt. Phosphonium salts are represented by, for example, tetraphenyl-P$^+$BF$_4^-$, triphenyl-benzoylmethyl-P$^+$AsF$_6^-$, dimethyl-phenyl-benzoylmethyl-N$^+$BF$_4^-$. Phosphonium salts are further described in U.S. Pat. No. 4,069,055, hereby incorporated by reference.

Many onium salt photo catalysts are available commercially. One skilled in the art would know how to select an onium salt photo catalyst.

The condensation catalyst can be any known condensation catalyst that will function to cause the condensation cure of the composition. Condensation cure catalysts are well known. These catalysts are metal complexes of tin, titanium, aluminum, zinc, zirconium, etc., or Bronsted acids of non-metal compounds such as acetic acid, ammonium carboxylates, etc. Tin compounds which may be used are, for example, dibutyltindilaurate; dibutyltindiacetate; dibutyltindimethoxide; carbomethoxyphenyl tin trisuberate, tin octoate; isobutyl tin triceroate; dimethyl tin dibutyrate; dimethyl tin di-neodecanoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindacetate is particularly preferred. Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention. Zirconium compounds, for example, zirconium octoate, also can be used. Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate. Examples of nonmetal condensation catalysts are hexylammonium acetate and benzyltrimethylammonium acetate.

The dual cure composition comprises from 5 to 95% (w/w), alternatively from 20 to 90% (w/w), alternatively from 30 to 85% (w/w), alternatively from 40 to 80% (w/w), based on the weight of the silicone resin and silicone polymer, of the silicone resin.

The dual cure composition comprises from 5 to 95% (w/w), alternatively from 10 to 80% (w/w), alternatively from 15 to 70% (w/w), based on the weight of the silicone resin and silicone polymer, of the silicone polymer.

The dual cure composition comprises a catalytic amount of onium salt photo catalyst, alternatively from 0.005 to 5% (w/w), alternatively from 0.1 to 2.5% (w/w), based on the weight of the silicone resin and silicone polymer, of the onium salt photo catalyst.

The dual cure composition comprises a catalytic amount of condensation catalyst, alternatively from 0.005 to 5% (w/w), alternatively from 0.1 to 2.5% (w/w), alternatively from 0.5 to 1.5% (w/w), based on the weight of the silicone resin and silicone polymer, of the condensation catalyst.

The composition may contain up to 20% (w/w), alternatively 10% (w/w), alternatively 5% (w/w), based on the weight of the dual cure composition, of other ingredients commonly included in curable silicone compositions such as: dyes, dye sensitizers, fillers and reactive diluents. One skilled in the art would know the ingredients and additives typically used in curable compositions.

Dye sensitizers to increase the effectiveness of the photocatalyst are understood to generally function by absorbing light of a spectrum which has little or no effect on the catalyst and releasing the absorbed light in a form to effect the photocatalyst. Thus, the use of a dye sensitizer may result in better utilization of the energy available from the light source. Dyes which can be used in combination with the above described onium salts are cationic dyes, such as shown in Vol. 20, p. 194-7 of the Kirk-Othmer Encyclopedia, 2nd Edition, 1965, John Wiley & Sons, New York. Some of the cationic dyes which can be used are, for example, Acridine orange; C.I. 46005; Acridine yellow; C.I. 46035; Phosphine R; C.I. 46045; Benzoflavin; C.I. 46065; Setoflavin T; C.I. 49005. In addition to the above, basic dyes can also be used. Some of these basic dyes are shown in Vol. 7, p. 532-4 of Kirk-Othmer Encyclopedia, as cited above, and include: Hematoporphyrin; 4,4'-bisdimethylaminobenzophenone and 4,4'-bisdiethylaminobenzophenone. Also, suitable are xanthones, such as thioxanthone, 2-isopropyl thioxanthone, and aminoxanthene.

The reaction vessel used to make the dual cure composition may be any vessel typically used to make curable silicone compositions of similar viscosity.

There is no particular order of addition, rate of addition, temperature or time for combining the components to make the dual cure composition. For example, the silicone polymer, silicone resin, photo catalyst, and condensation catalyst may be added together and mixed with an appropriate mixer for mixing compositions of the viscosity of the dual cure composition. The composition once combined is mixed until the composition has been thoroughly mixed.

The dual curable composition cures to a tensile strength of at least 100, alternatively from 400 to 2000, alternatively 500 to 1500 psi. Tensile strength may be measure according to ASTM D412.

The dual curable composition cures to give a coating with an elongation of 2 to 40%, alternatively 5 to 30%. Elongation is measure according to ASTM D412.

The dual curable composition cures to give a coating with a Shore A Hardness of at least 50, alternatively from 60 to 100, alternatively from 65 to 90, alternatively from 70 to 85. Shore A Hardness is measure according to ASTM D2240.

The dual curable composition will cure when exposed to UV irradiation. There is no specific amount of UV radiation to cure the dual cure composition. Exposure to less intense radiation will take longer to cure.

There is no specific amount of moisture required to cure the dual curable composition. Exposure to lesser amounts of water will cure in a longer time than those compositions exposed to more water.

A method of curing the dual cure composition, the method comprising: exposing the dual cure composition to UV radiation, moisture, or UV radiation and moisture.

A method of providing a protective coating to an article, the method comprising: applying the dual cure composition to the article to form a coated article. The method may further comprise exposing the coated article to UV radiation, moisture, or UV radiation and moisture.

An article having a coating or partial coating of cured dual cure composition.

All ranges used herein are intended to be inclusive of the outermost value of the range.

The dual curable composition is curable when exposed to UV radiation, $H_2O$, or UV radiation and $H_2O$. The dual curable composition cures to provide a superior hard coating as measured by Shore A Hardness compared to other UV and moisture cure silicone compositions while also providing flexibility.

EXAMPLES

The following examples are presented to better illustrate the method of the present invention, but are not to be considered as limiting the invention, which is delineated in the appended claims. Unless otherwise noted, all parts and percentages reported in the examples are by weight. The following Table 1 describes the abbreviations used in the examples:

TABLE 1

List of abbreviations used in the examples.

| Abbreviation | Word |
| --- | --- |
| g | gram |
| Me | methyl |
| wt | weight |
| % | percent |
| mol | mole |
| hr | hour |
| ° C. | degrees Celsius |
| NA | Not Applicable |
| mL | milliliters |
| Ep | glycidoxypropyl or [2-(3,4-epoxycyclohexyl)ethyl] |
| Ph | Phenyl |
| iBu | Isobutyl |
| OMe | Methoxy |
| RT | Room Temperature |

Example 1: Preparation of Silicon Resin

MeSi(OMe)3 (119 g), 105 g of Me2Si(OMe)2 and 39 g of Me3Si(OMe), were added into a round bottom flask. The flask was purged with Nitrogen and stirred. Then 1.1 g CsOH was dissolved in water and transferred to the flask followed by addition of 92.25 g of glycidoxypropyltrimethoxysilane. Then water was slowly added to the flask at room temperature. After the water addition, the flask contents were heated to 50-60° C., and the reaction was stirred at this temperature for 1 hour. Next, 200 g of toluene were added and the contents refluxed. The methanol water phase was removed from the Dean-Stark traps. After 1-3 hours, the reaction temperature was raised slowly to let toluene reflux, driving off all the water. After all the water was removed, the heat was turned off, and the reaction temperature lowered to 60-80° C., the reaction was neutralized with octyl silylphosphonate. The reaction products were determined by gas chromatography and Si NMR.

Example 2: Preparation of Silicone Polymer

Silanol fluid (206.7 g; average dimethylsiloxy repeat unit 18.4) was charged into a round bottom flask. Next, 117 g of 3-glycidoxypropyltrimethoxysilane, and 2.6 g of acetic acid (glacial) were added to the flask, and the flask was stirred under nitrogen blanket, heated to 110-120° C. for 5 hours. Methanol was collected in a Dean-Stark trap. Volatiles (cyclics from silanol fluid and residual methanol) and unreacted 3-glycidoxypropyltrimethoxysilane) were removed under vacuum (<3 mmHg) at 120° C. for 1 hour. The product yield was 264.2 g.

Example 3: Preparation of Dual Cure Compositions

Compositions were formed by combining the individual ingredients with mixing. The ingredients of the compositions were as follows:

SR—Silicone resin having the formula $[PhMeSiO_{2/2}]_{0.35}$ $[EpSiO_{3/2}]_{0.16}[iBuSiO_{3/2}]_{0.49}$ SP—Silicone polymer having the formula $[Me_2EpSiO_{1/2}]_2$ $[Me_2SiO_{2/2}]_{18}[MeEpSiO_{2/2}]_{0.4}$ PC—Photo catalyst: (3-methylphenyl)(($C_{12-13}$ branched) phenyl)Iodonium hexafluoroantimonate.

CC—Condensation catalyst: diisopropoxytitanium bis(ethylacetoacetate).

The components were mixed and then the compositions tested for curing with UV radiation and moisture and with UV radiation alone by exposing part of the composition to UV radiation while shield another part of the composition from the UV radiation. The formulations and test results are in the following Table 2.

TABLE 2

Formulations made and tested for mechanical properties.

| Ingredient/Test | Weight (g) | | | |
|---|---|---|---|---|
| | A | B | Comparative Example C | Comparative Example D |
| SR | 80 | 40 | 100 | 0 |
| SP | 20 | 60 | 0 | 100 |
| CC | 0.3 | 0.3 | 0.3 | 0.3 |
| PC | 1 | 1 | 1 | 1 |
| UV exposure area 2 J/cm² irradiation | Cured | Cured | Cured | Cured |
| Shadow Area (48 hr. at RT) | Cured | Cured | Not Cured | Cured |
| Tensile Strength (psi) | 853 | 660 | Not able to be measured; too brittle | 53 |
| Elongation (%) | 15 | 8 | Not able to be measured; too brittle | 8 |
| Shore A Hardness | 85 | 70 | 92 | 55 |

The results show the benefit in hardness and flexibility and cure of the formulations containing both the silicone resin and the silicone polymer.

That which is claimed is:

1. A dual curable silicone composition, comprising:
   (a) a silicone resin comprising at least one epoxy group, wherein the silicon resin is according to formula (I)

$[R^1R^2R^3SiO_{1/2}]_a[R^4R^5SiO_{2/2}]_b[R^6SiO_{3/2}]_c[SiO_{4/2}]_d$, (I)

where each $R^{1-6}$ is independently hydrocarbyl, H, hydroxyl, alkoxy, or epoxy-containing group and at least one of $R^{1-6}$ is an epoxy-containing group, and where a+b+c+d=1 and c+d>0,
   (b) a silicone polymer comprising at least one epoxy group and at least one hydrolyzable group, wherein the silicon polymer is according to formula (II)

$[R^7R^8R^9SiO_{1/2}]_e[R^{10}R^{11}SiO_{2/2}]_f$, (II)

where each $R^{7-11}$ is independently hydrocarbyl, H, hydroxyl, a hydrolyzable group, or epoxy-containing group and at least one of $R^{7-11}$ group is hydrolyzable group and at least one of one $R^{7-11}$ group is an epoxy-containing group and wherein e>0 and f>0,
   (c) a catalytic amount of onium salt photo catalyst,
   (d) a catalytic amount of condensation catalyst,
   wherein the composition is curable when exposed to UV radiation, H₂O, or UV radiation and H₂O.

2. The composition according to claim 1, wherein each of the epoxy groups of the silicone resin and the silicone polymer are independently substituted hydrocarbyl having from 1 to 18 carbon atoms, wherein the substitution is an epoxy or epoxy ether group.

3. A composition according to claim 1, wherein the epoxy group is glycidoxypropyl, glycidyl, hexenyl oxide, hexeneoxyalkyl oxide, [2-(3,4-epoxycyclohexyl)methyl], [2-(3,4-epoxycyclohexyl)ethyl], or [2-(3,4-epoxycyclohexyl)propyl].

4. The composition according to claim 1, wherein the hydrolyzable group bonded to a silicon atom through a S, O, N, or P, or a halogen atom.

5. The composition according to claim 4, wherein the hydrolyzable group is $C_{1-8}$ alkoxy or halogen.

6. The composition according to claim 1, wherein the onium salt photo catalyst is a halonium photocatalyst.

7. The composition according to claim 1, wherein the condensation catalyst is a metal complex of tin, titanium, aluminum, zinc, or zirconium.

8. A method of providing a protective coating to an article, the method comprising:
   applying the composition of claim 1 to the article.

9. The protected article formed by the method of claim 8.

10. A method of making a dual curable composition, the method comprising: combining
    (a) a silicone resin comprising at least one epoxy group, wherein the silicon resin is according to formula (I)

$[R^1R^2R^3SiO_{1/2}]_a[R^4R^5SiO_{2/2}]_b[R^6SiO_{3/2}]_c[SiO_{4/2}]_d$, (I)

where each $R^{1-6}$ is independently hydrocarbyl, H, hydroxyl, alkoxy, or epoxy-containing group and at least one of $R^{1-6}$ is an epoxy-containing group, and where a+b+c+d=1 and c+d>0,
    (b) a silicone polymer comprising at least one epoxy group and at least one hydrolyzable group, wherein the silicon polymer is according to formula (II)

$[R^7R^8R^9SiO_{1/2}]_e[R^{10}R^{11}SiO_{2/2}]_f$, (II)

where each $R^{7-11}$ is independently hydrocarbyl, H, hydroxyl, a hydrolyzable group, or epoxy-containing group and at least one of $R^{7-11}$ group is hydrolyzable group and at least one of one $R^{7-11}$ group is an epoxy-containing group and wherein e>0 and f>0,
    (c) a catalytic amount of onium salt photo catalyst,
    (d) a catalytic amount of condensation catalyst,
    wherein the composition is curable when exposed to UV light or hydrolysis conditions.

* * * * *